Aug. 11, 1953    J. A. LIGNIAN    2,648,580
ALUMINUM BASE BEARING
Filed Nov. 26, 1947
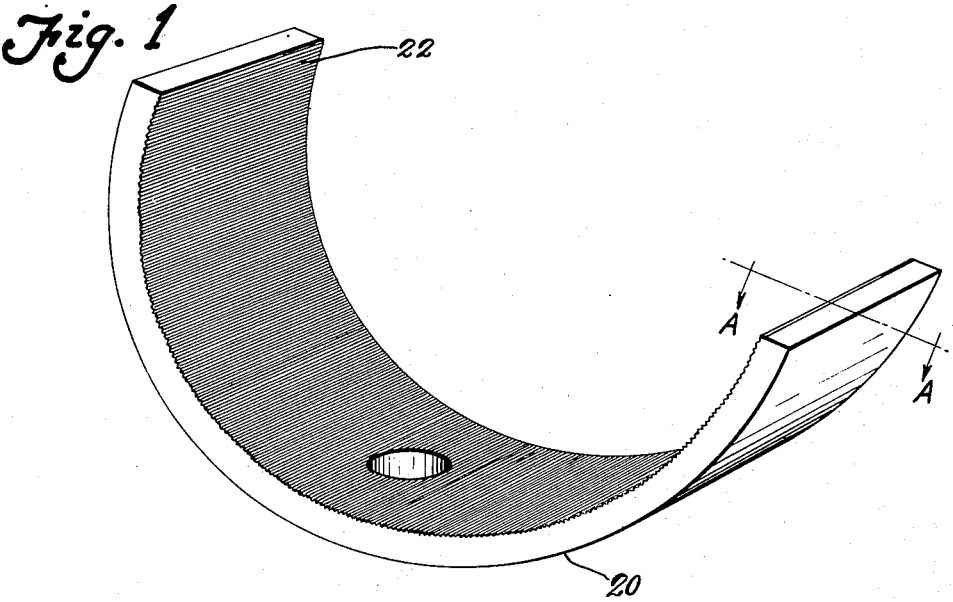
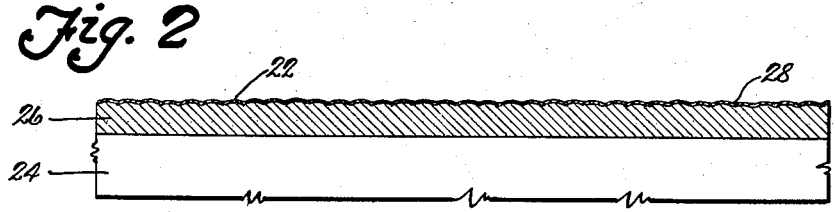
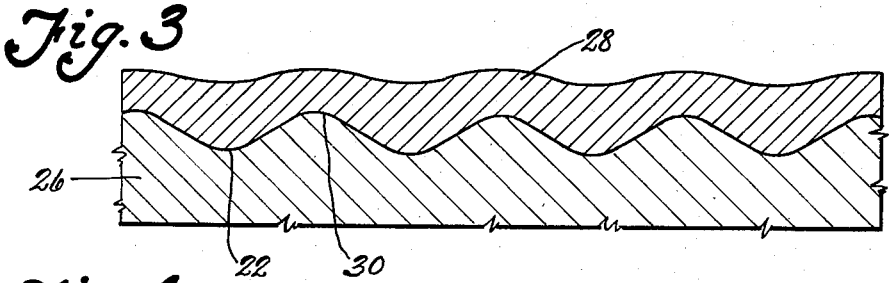
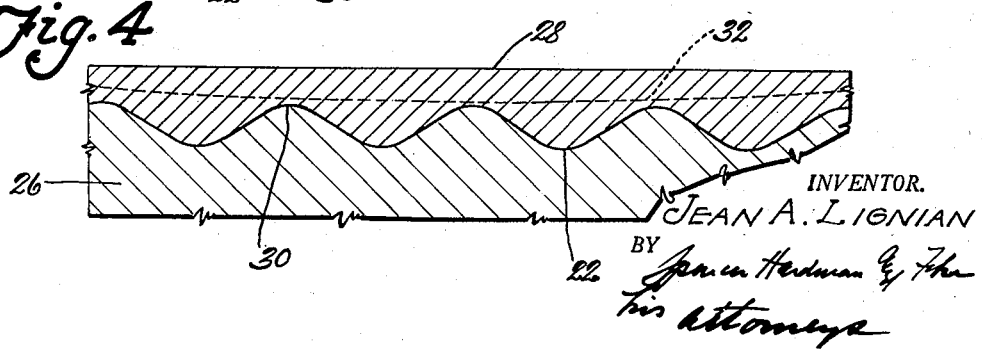
INVENTOR.
JEAN A. LIGNIAN
BY
his attorneys Patented Aug. 11, 1953

2,648,580

UNITED STATES PATENT OFFICE 2,648,580

ALUMINUM BASE BEARING

Jean A. Lignian, Dayton, Ohio, assignor to General Motors Corporation, Detroit, Mich., a corporation of Delaware Application November 26, 1947, Serial No. 788,221

3 Claims. (Cl. 308—237)

This invention relates to bearings and is particularly concerned with composite types of bearings wherein the main portion of the bearing includes a good bearing material overlaid with a relatively thin layer of another bearing material for improving the overall operating characteristics of the bearing.

It is therefore a prime object of this invention to provide an improved bearing of the composite type wherein two layers of bearing material are utilized, one upon the other, and wherein movement of the top bearing layer relative to the bottom bearing layer is retarded or prevented through the use of transverse grooves in the bottom layer.

A still further object of the invention is to provide a composite type of bearing wherein the main body of the bearing consists of bearing metal taken from the class comprising aluminum, aluminum base alloys, bearing bronzes, leaded bronzes, silver, copper-lead, oxygen free copper or other suitable bearing metals, which material is grooved transversely to the direction of rotation of use and which material has overlaid thereon an electro-deposited layer of another bearing metal taken from the class of metals known as white bearing metals and consisting of alloys of lead, tin, and/or antimony alone or together with small quantities of other suitable metals such as copper, indium, calcium, arsenic, etc.

A still further object of the invention is to provide a bearing of the composite type wherein an aluminum alloy is used as a base material which has transverse grooves therein which do not exceed .001" in depth and which has plated thereover a layer of another bearing metal such as a lead base alloy not in excess of .001" in thickness.

A still further object of the invention is to provide a bearing which will have desirable qualities such as conformability and embedability together with good bearing properties and which will not tend to score during use under heavy loads.

Further objects and advantages of the present invention will be apparent from the following description, reference being had to the accompanying drawing, wherein preferred embodiments of the present invention are clearly shown.

In the drawing:

Fig. 1 is a view in perspective of a typical semi-cylindrical automotive bearing.

Fig. 2 is a section on a greatly enlarged scale of a portion of a plane of said bearing taken in the direction of arrows A—A.

Fig. 3 is a view similar to Fig. 2 but shows a section on an even greater scale.

Fig. 4 shows the same section as shown in Fig. 3 after the bearing has been run in, the dotted line showing the approximate line of wear of the bearing after service.

Heavy duty composite bearings, such as are used in internal combustion engines and the like, have been found to fail under heavy loads due to numerous factors. The first cause for these failures is a poor bond between various components of the bearing. Another factor concerns the compressibility of the bearing which, when the bearing layer is soft, such as a lead base alloy, will compress to a degree where the bearing clearance becomes excessive under heavy duty work if the bearing layer is of any appreciable thickness. In order to overcome this last difficulty and to a degree overcome bonding difficulties, a bearing material having a lower degree of compressibility has been sought. Aluminum and aluminum base alloys have been found to be highly desirable for this purpose. These materials have good bearing qualities, high wear resistance and are very slightly compressible under extremely high loads with the result that bearings made therefrom are very useful. It has been found however that aluminum bearings per se have a tendency to score and abrade under high loads when high temperatures are encountered and thus while such bearings are useful in many applications, there are other applications where use of the bearings is not desirable. To overcome this difficulty, I have found that a white metal bearing layer of extremely small thickness eliminates the scoring difficulties in the aluminum since it acts as a surface lubricant and permits a rapid establishment of oil film and also through its softness has a degree of embedability which prevents scoring of the surface of the bearing by particles of foreign matter which may be carried by the lubricant. I have found that lead-tin, lead antimony, lead-tin antimony and other white bearing metals when electro-deposited on the surface of aluminum in layers of not over .001" provide a highly improved bearing which operates well under most extreme conditions. Heavy duty testing of this type of bearing however shows that when extremely high temperatures are encountered or when large foreign particles are present, that the white metal layer scores in some cases and also under heavy duty performance that there is a tendency toward migration of the white metal from one portion to another which ultimately robs certain portions of the bearing surface of the white metal layer and causes them to abrade or score.

In order to defeat the tendency toward migration of the white bearing metal, I have found that if the surface of the bearing is roughened through grooving in a direction transverse to the direction of rotation of the bearing, prior to electro-deposition of the white bearing metal, that these grooves tend to act as dams for the white metal and prevent migration thereof in any appreciable degree and likewise act as reservoirs for the soft bearing metal and thus generally aid the bearing qualities of the unit. In fact, upon use, it has been found that when the white metal has been practically worn off of the high spots of the bearing that transverse strips of white metal are still present in the grooved sections which white metal constantly wipes over the lands or high spots to provide a highly desirable bearing.

Referring specifically to the drawings, a typical automotive bearing of semi-cylindrical shape is shown at 20 in Fig. 1. The grooving of the bearing surface is noted at 22. In Fig. 2, this grooving 22 is magnified and in this case a composite type of bearing is shown wherein a steel backing 24 is provided having an aluminum or aluminum alloy layer 26 which is bonded thereto and which has a surface thereof grooved as at 22 after which a thin layer of electro-deposited white metal is laid on at 28. Fig. 3 shows another view of the section of the bearing at an even greater enlargement wherein the roughness of the surface of the aluminum layer 26 is shown in visible detail wherein the grooves 22 are separated by high points or lands 30. Due to the method of producing these grooves as will be explained hereinafter, the spacing therebetween is not always uniform and in fact does not need to be, neither is the depth of the grooves uniform but may vary between limits to be set forth herein. On this grooved surface 22 as shown in Fig. 3, a white metal bearing layer 28 is deposited which will have an undulating surface due to the grooved surface of the aluminum.

In Fig. 4 the same section is shown after run in. In this instance, the undulating surface of the white metal layer 28 has smoothed out due to a slight permanent deformation of the surface metal into a uniform smooth surface which smoothing out process facilitates immediate establishment of an initial oil film. The dotted line 32 is indicative of the line of wear of the white metal bearing surface after use and in this instance, as the white metal wears away, the supporting points of the aluminum bearing layer as denoted by lands 30 begin to carry the load. At no time however do I believe that the white metal is completely eliminated from the surfaces of these lands since additional white metal constantly is being wiped over from the grooved sections 22.

Bearings of this type have shown remarkable results in actual tests wherein greater life has been obtained over bearings of conventional composite types using the same materials. The success of the bearing is attributed to the transverse grooved surface thereof and to the critical limits of thicknesses of the various layers utilized.

In the manufacture of bearings, the grooved surface is obtained through the use of a roughened broach. A semi-cylindrical bearing is placed in a fixture and the bearing surface is broached to bring the bearing to a desired wall thickness. This broach in the past has always been polished to remove any roughness. I have found that by premeditately roughening the surface of the broach, a grooved surface may be obtained on the bearing and to this end the roughness of the broach may be easily controlled by utilizing grinding wheels therefor having different degrees of roughness. The bearing surface is roughened by operating thereon with a rough broach to provide grooves in the bearing surface having a depth of from .0002" to .001", with lands between the grooves having widths ranging from .000" to .010". Thus it will be apparent that these grooves are extremely small in magnitude although they can usually be seen with the naked eye.

The electro-deposited layer of white bearing metal should not be less than a flash nor in excess of .001" thick. Experience has shown that the bearing operates well anywhere within these limits. Electro-deposition of white bearing metals is well known under the terminology of coplating and has been done successfully in production with various lead alloys such as lead-tin, lead antimony, etc., together with small quantities of various other alloying ingredients, the co-deposition of these metals forms no portion of this invention and is well known in the art.

While this entire disclosure has been directed to the use of white metal bearing layers on aluminum or aluminum alloy metal, it is obvious that the same expedient namely a roughened bearing surface transverse to the direction of rotation of the bearing may be used to advantage in other types of bearings wherein bearing bronzes, leaded bronzes, silver, copper-lead, oxygen free copper or any other suitable bearing metal are used as a base. In all of these cases as in the case of aluminum and aluminum alloys, the primary bearing layer may be supported on and bonded to a stronger metal such as steel and the like and here again the methods for bonding such materials form no portion of this invention since numerous expedients have been disclosed for making composite sheet material of aluminum and steel in Harold W. Schultz applications Serial No. 652,470, Serial No. 652,469, Serial No. 761,094 assigned to the assignee of the present invention and all of which are now abandoned. In all cases it is to be understood that the roughened bearing surface with the electro-deposited layer thereon may be used with equal success in connection with bearings of a suitable bearing metal alone or bonded to a steel or other strong metal backing member.

It is within the purview of this invention to apply the white bearing metal by means other than electro-deposition. For example, the bearing may be dipped in a molten bearing alloy and the thickness of the layer controlled by centrifuging, etc., as is well known.

While the embodiments of the present invention as herein disclosed, constitute preferred forms, it is to be understood that other forms might be adopted, all coming within the scope of the claims which follow.

What is claimed is as follows:

1. A bearing for heavy duty work, comprising in combination; a base metal having good frictional characteristics and taken from the class consisting of aluminum and aluminum alloys and having a roughened surface constituting minute grooves running transversely to the direction of rotation of the bearing, said grooves having a depth of between .0002" and .001" and being spaced radially at distances not greater than .010" from one another, and a layer of soft bearing metal overlaying said roughened surface and comprising a codeposited layer taken from the class consisting essentially of lead, tin, antimony and alloys thereof, said layer having a thickness within the range of a flash coating to .001" and having an undulating surface approximating and of less magnitude than the undulations of the grooved surface.

2. The article as claimed in claim 1 wherein the base metal layer is coextensively bonded to a steel backing member.

3. A bearing for heavy duty work, comprising; a steel backing member, a layer of a good bearing metal coextensively bonded thereto wherein said layer consists of a metal taken from the class of aluminum and aluminum alloys, said bearing metal layer having a roughened surface constituting a plurality of minutely spaced grooves running transversely to the direction of rotation of the bearing wherein each groove has a depth of between .0002" and .001" and wherein the land surfaces of the grooves are spaced at distances not greater than .010" from one another radially of the bearing, and a soft metal bearing layer overlaying said roughened surface and having an undulating surface approximating and of less magnitude than the undulations of the grooved surface, said soft bearing metal layer being codeposited onto the surface of said bearing metal in a thickness within the range of a flash coating to .001".

JEAN A. LIGNIAN.

References Cited in the file of this patent

UNITED STATES PATENTS

| Number | Name | Date |
| --- | --- | --- |
| 1,158,862 | Sanford | Nov. 2, 1915 |
| 1,331,961 | Klocke | Feb. 24, 1920 |
| 1,333,336 | Pack | Mar. 9, 1920 |
| 2,173,985 | Strickland et al. | Sept. 26, 1939 |
| 2,187,755 | Ryder | Jan. 23, 1940 |
| 2,266,319 | Hobbs | Dec. 16, 1941 |
| 2,289,572 | Underwood | July 14, 1942 |
| 2,316,119 | Bagley | Apr. 6, 1943 |
| 2,333,227 | Bagley | Nov. 2, 1943 |
| 2,386,951 | Howe | Oct. 16, 1945 |